United States Patent [19]

Long et al.

[11] Patent Number: 4,508,217

[45] Date of Patent: Apr. 2, 1985

[54] STORAGE CONTAINER AND DISPLAY DEVICE

[75] Inventors: Jerry M. Long, Scotts Valley; James A. Womack, Los Gatos, both of Calif.

[73] Assignee: Innovative Concepts, Inc., San Jose, Calif.

[21] Appl. No.: 322,968

[22] Filed: Nov. 19, 1981

[51] Int. Cl.$^3$ .............................................. B65D 85/57
[52] U.S. Cl. ................... 206/45.18; 206/425; 206/444; 206/472; 220/339
[58] Field of Search ............... 206/44 R, 45.11, 45.13, 206/45.14, 45.2, 45.22, 45.23, 45.28, 45.29, 45.3, 45.31, 232, 307, 309, 444, 445, 449, 45.15, 45.18, 472, 425; 220/331, 339; 312/8, 9, 10, 11, 13, 258, 274, 324, 325

[56] References Cited

U.S. PATENT DOCUMENTS

| | | | |
|---|---|---|---|
| 2,979,223 | 4/1961 | Rideout | 220/331 |
| 3,422,988 | 1/1969 | La Franca | 220/331 |
| 4,225,038 | 9/1980 | Egly | 220/339 |

Primary Examiner—George E. Lowrance
Assistant Examiner—Jimmy G. Foster
Attorney, Agent, or Firm—Claude A. S. Hamrick

[57] ABSTRACT

A storage container and display device for floppy diskettes, and the like, has a base portion (10) forming a receptacle (12) of generally rectangular configuration and having a support portion (14) hingedly attached thereto and removeably interlocked with a first portion (24) of an upper part (22). A second portion (26) of the upper part (22) is hingedly attached to the first portion (24) thereof so as to cooperatively form a holder for floppy diskettes, and the like. When both portions (24, 26) of the upper part (22) are swung open relative to one another, the contents thereof can be placed on display. Conversely, when both portions (24, 26) of upper part (22) of the unit are in overlying relation and folded into the receptacle (12) formed by the base portion (10) a compact storage unit results. A guide arrangement is associated with both the base portion (10) and the upper part (22) for facilitating relative movement between the various parts and portions of the device.

7 Claims, 9 Drawing Figures

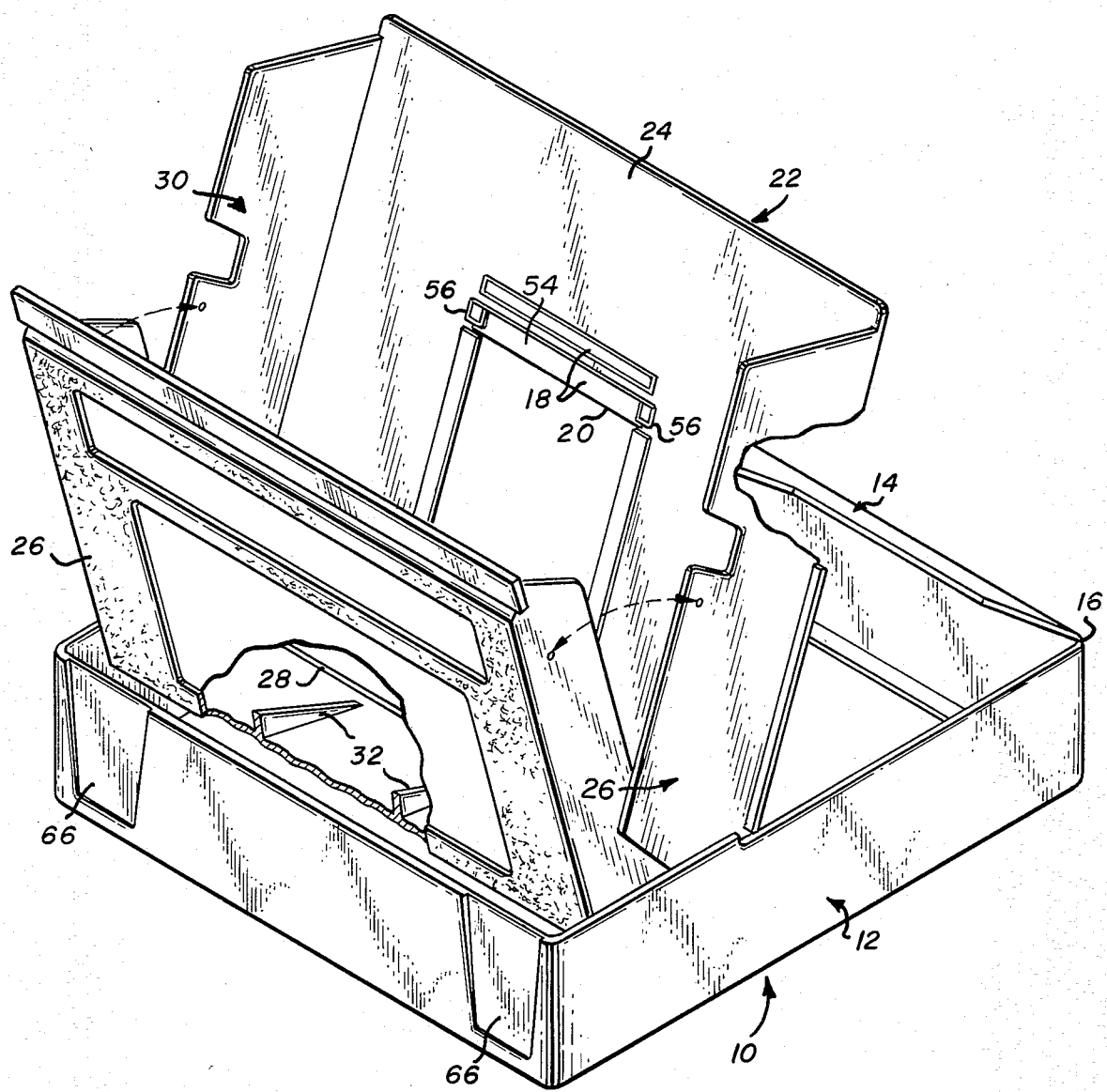
Fig_1

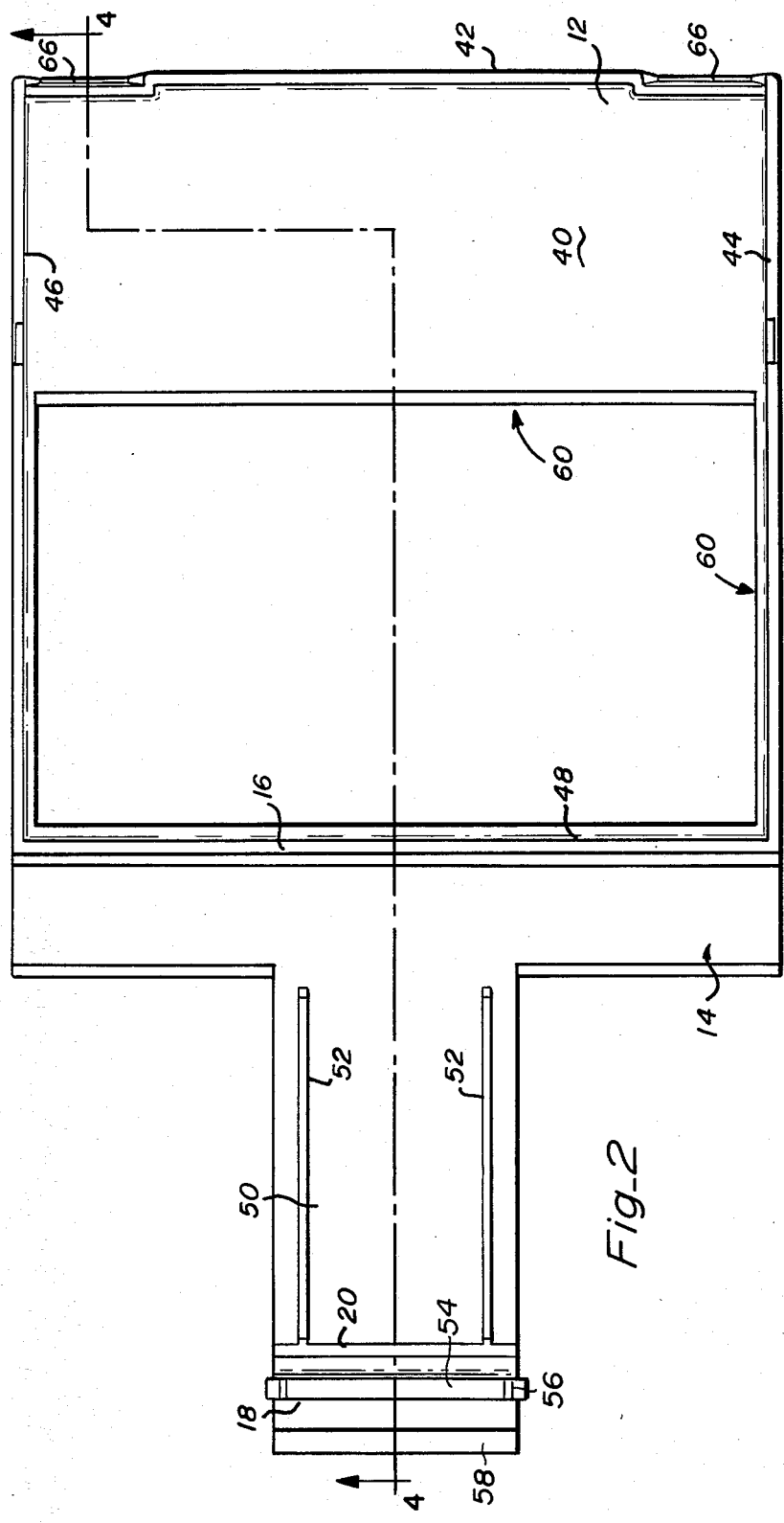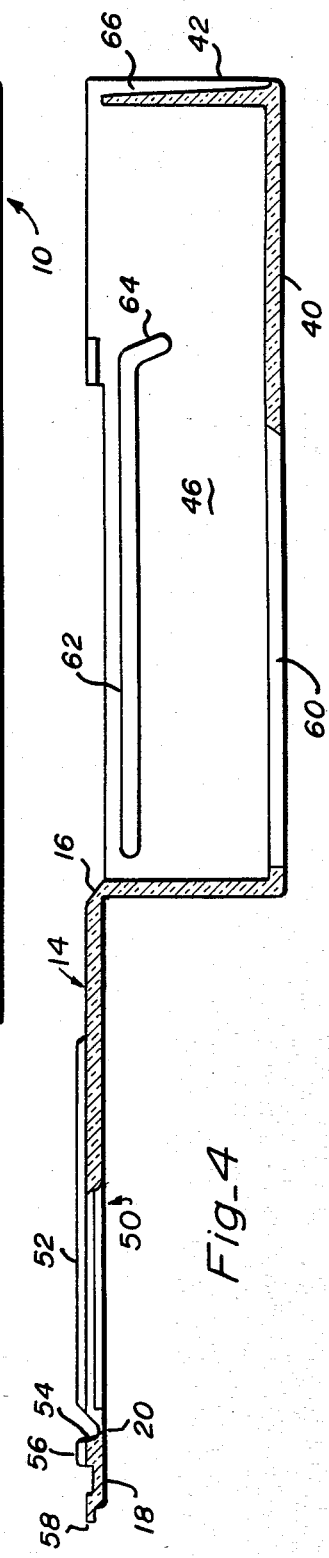

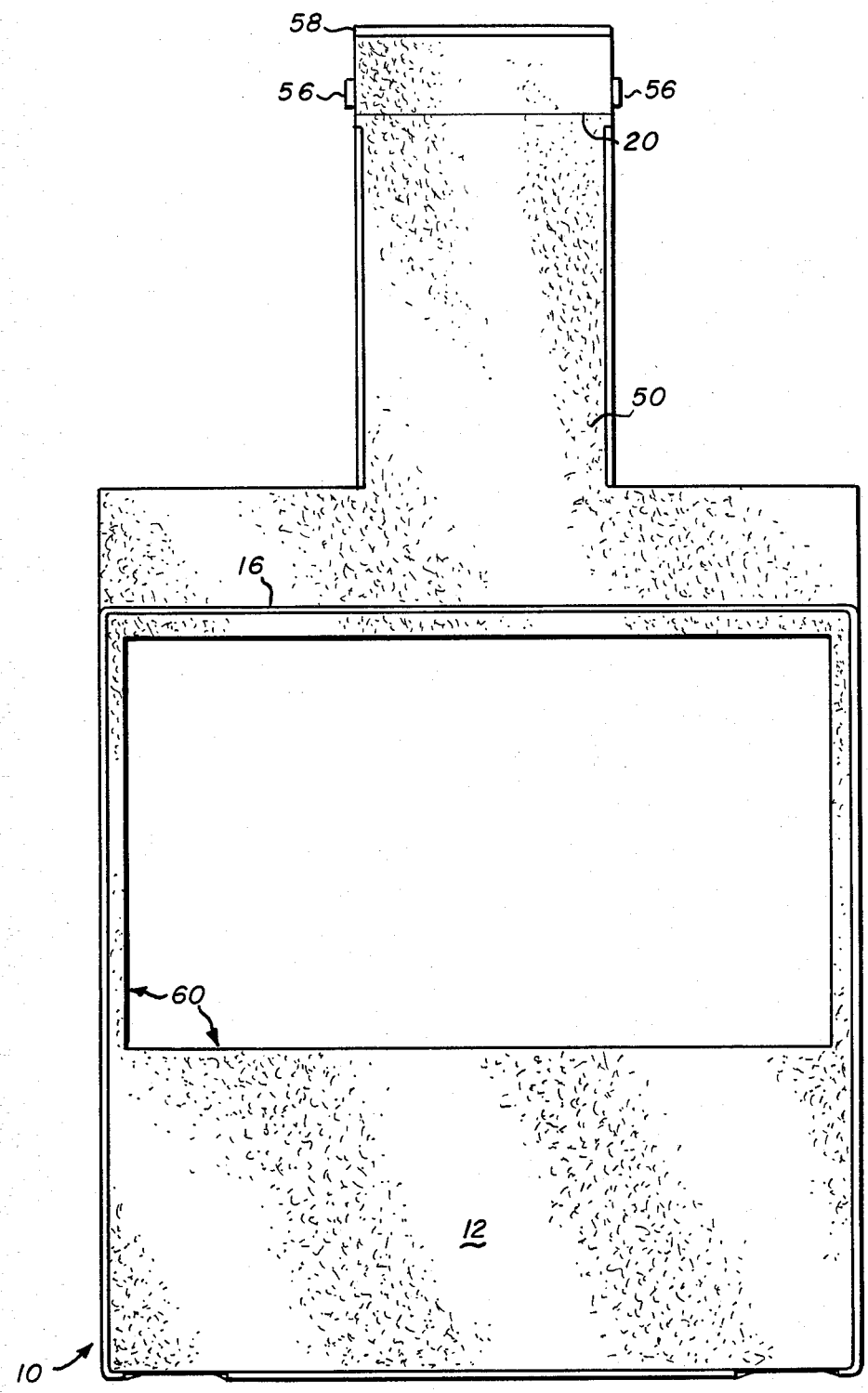
Fig_3

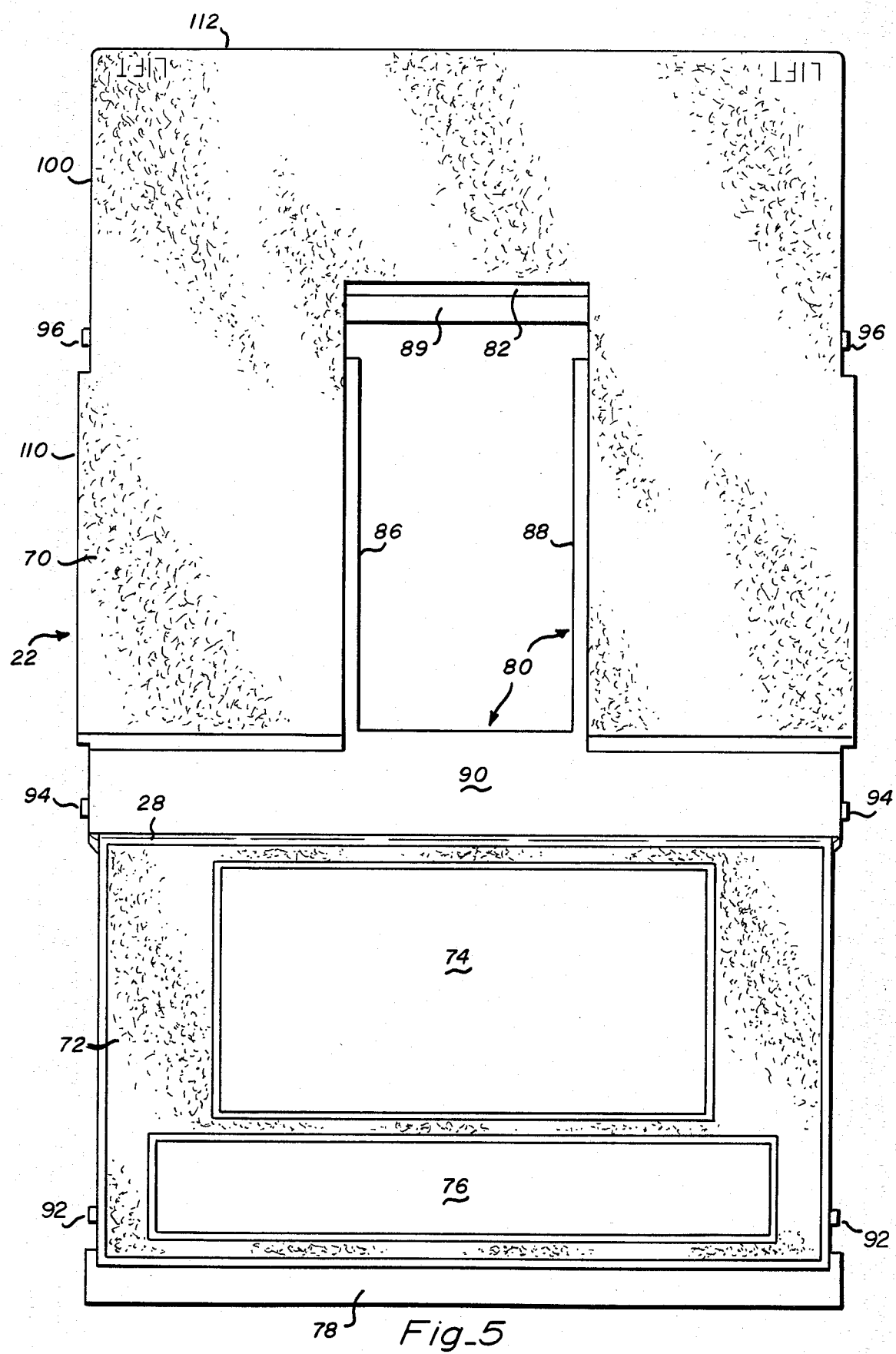
Fig_5

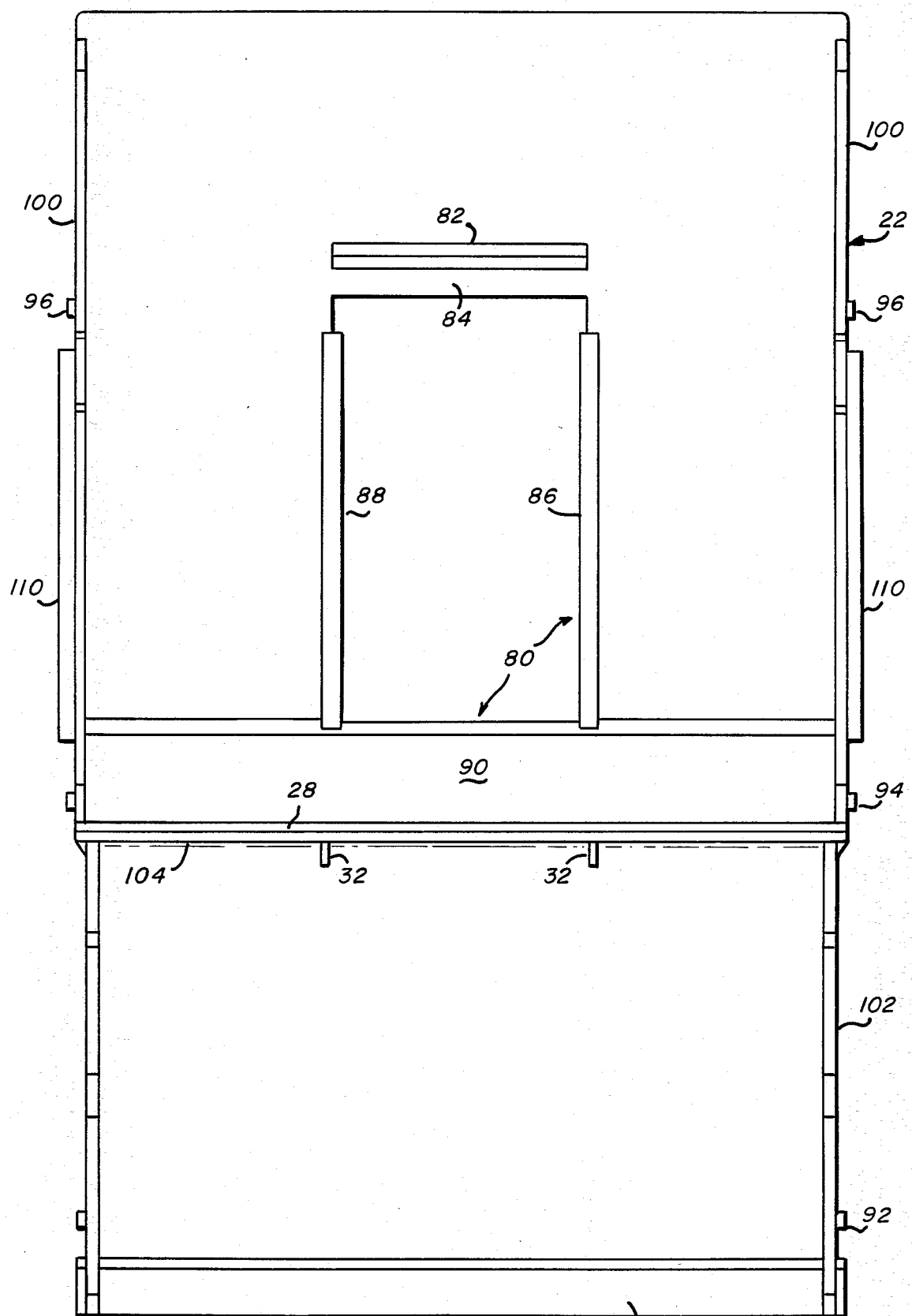
Fig_6

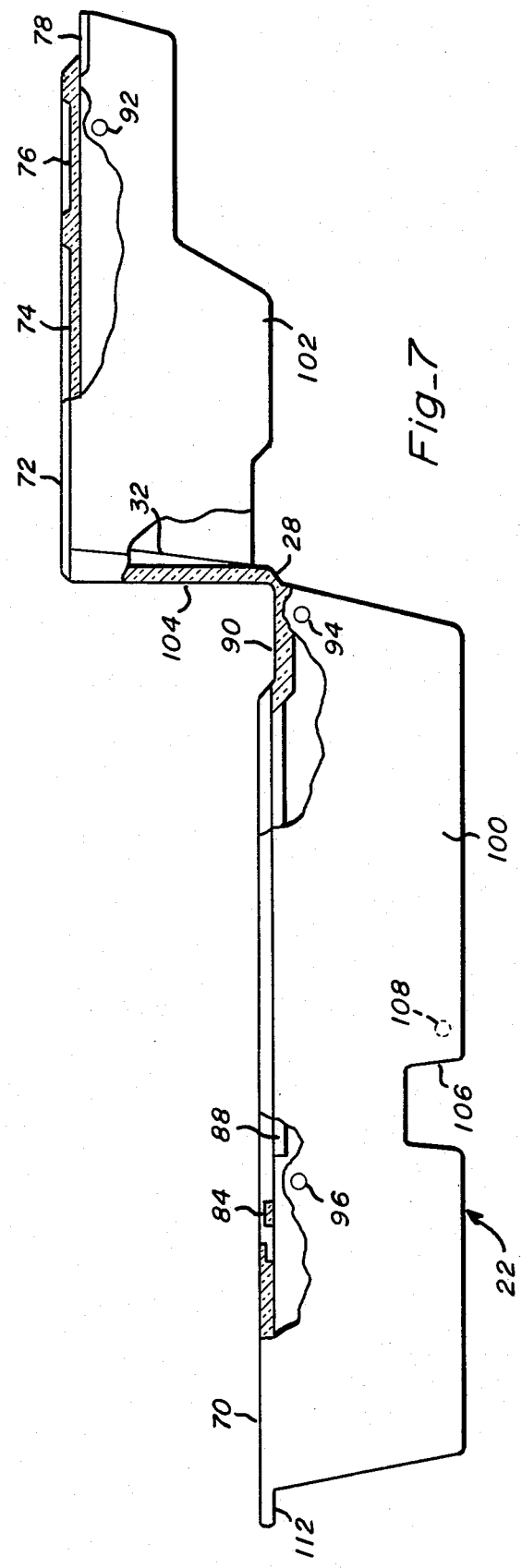
Fig_7

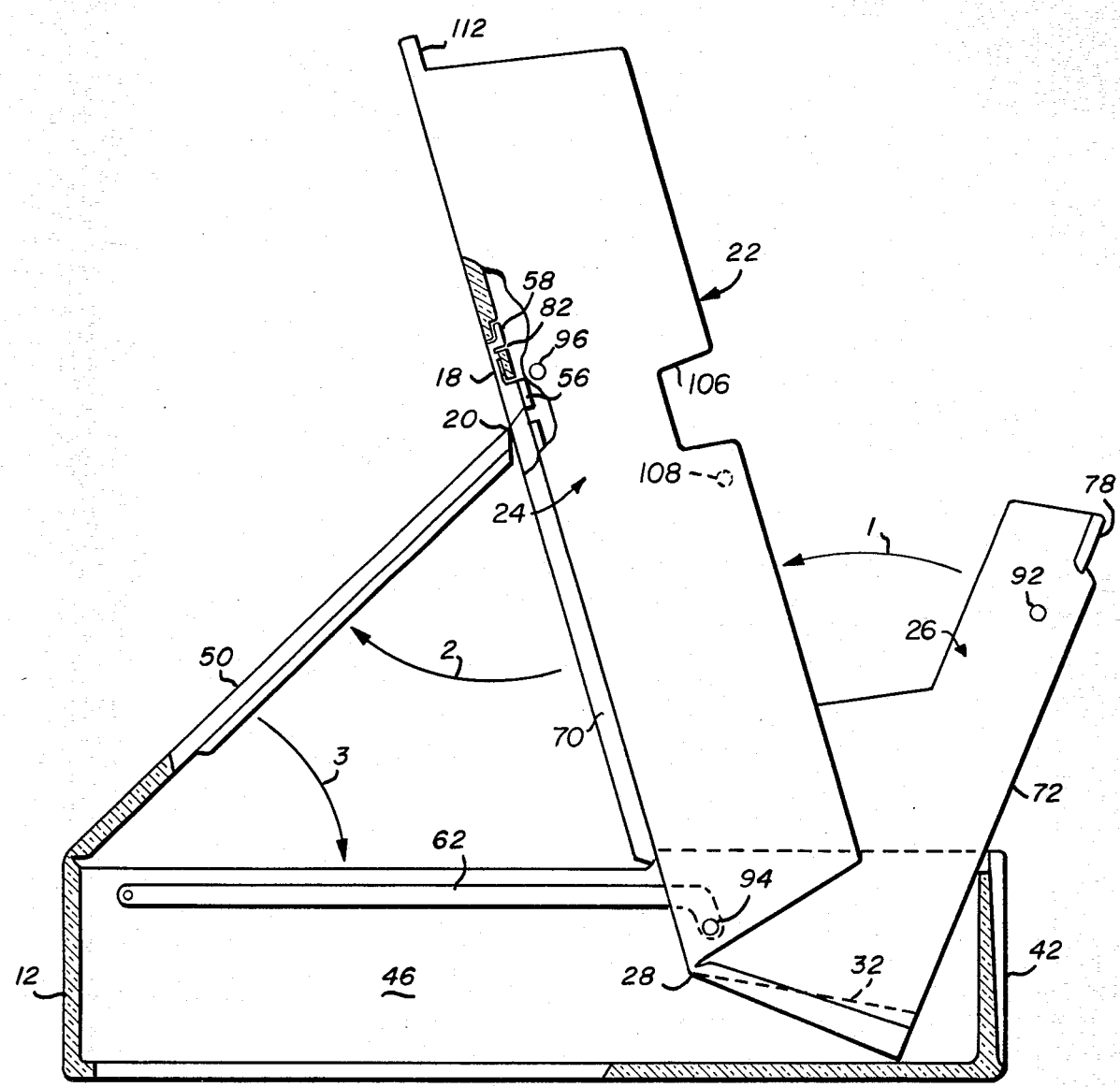
Fig_8
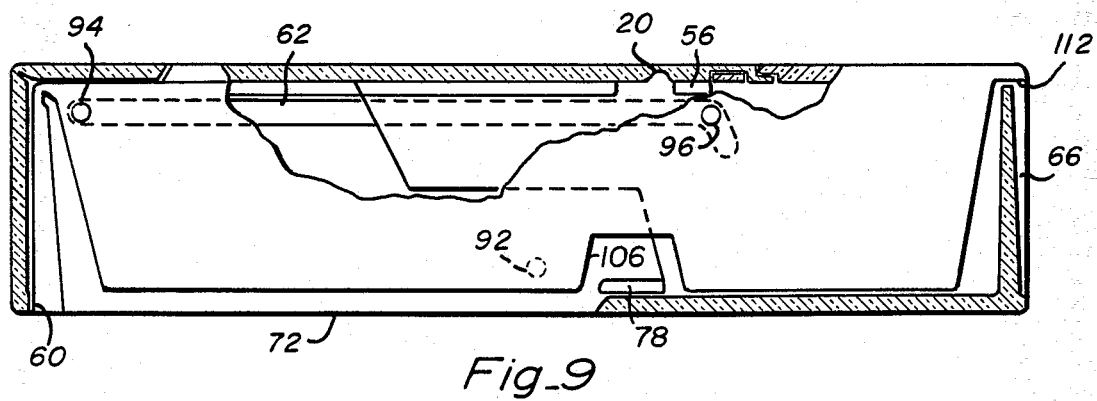
Fig_9

STORAGE CONTAINER AND DISPLAY DEVICE

BACKGROUND OF THE INVENTION

1. Field of the Invention

The present invention relates generally to storage containers for magnetic storage disks of the floppy diskette type and more particularly, to a two-part molded storage container which can be opened into a position providing ready access to the plurality of diskettes stored therein.

2. Description of the Prior Art

Numerous configurations of diskette container devices are provided in the prior art. Among such devices are those disclosed in U.S. Pat. No. Des. 251,273, issued Mar. 6, 1979, to R. A. Egly, and in U.S. Design application Ser. No. 080,417, filed Oct. 1, 1979, by Jerry M. Long, et al., and commonly owned herewith. The problems with most such devices are that where designed to be primarily oriented toward storage they do not provide easy access to the work processor or where designed to provide easy access to the functional user they are bulky for storage, and in order to provide compact storage they require a design which is complicated to manufacture.

SUMMARY OF THE PRESENT INVENTION

It is therefore a principal objective of the present invention to provide a two-piece molded and fully integrated storage and display container for floppy diskettes.

Briefly, a preferred embodiment of the present invention includes first and second molded parts having living hinges and matingly interlocked and slideable components each of which can be injection molded and then snapped together to form the completed unit. Index and label areas are provided which are visible in both the storage configuration and the use configuration.

A principal advantage of the present invention is that all components thereof can be molded using a two-cavity mold. Another advantage of the present invention is that it requires no additional component parts other than stick-on labels.

Still another advantage of the present invention is that it can be assembled by an unskilled worker without the use of any tools.

Other objects and advantages of the present invention will no doubt become apparent to those skilled in the art after having read the following detailed description of the preferred embodiment.

IN THE DRAWING

FIG. 1 is a partially broken perspective view illustrating the present invention opened into its display position;

FIG. 2 is a plan view showing the upper surfaces of the base portion;

FIG. 3 is a plan view showing the bottom surfaces of the base portion;

FIG. 4 is a cross section of the base portion taken along the line 4—4 of FIG. 2;

FIG. 5 is a plan view showing the top surfaces of the molded upper part;

FIG. 6 is a plan view showing the bottom surfaces of the upper part;

FIG. 7 is a partially broken side view of the upper part;

FIG. 8 is a partially broken side view showing the assembled unit in the display configuration; and FIG. 9 is a partially broken cross-sectional view showing the assembled unit in the storage configuration.

DETAILED DESCRIPTION OF THE PREFERRED EMBODIMENT

Referring now to FIG. 1 of the drawing, a floppy diskette storage and display unit in accordance with a preferred embodiment of the present invention is shown assembled and rotated almost fully into its display position, as will be further described below. The unit consists of a base portion 10 including a rectangular receptacle portion 12 and a partial closure and support portion 14 formed integral with the portion 12 and attached thereto by a living hinge shown at 16. The distal end of the portion 14 includes a male latching component shown in part at 18 and attached to portion 14 by a second living hinge shown at 20. The upper part 22 includes a rearward portion 24 and an integrally formed forward portion 26 attached thereto by a living hinge 28. As furthered described below, the upper part 22 forms a receptacle for containing and displaying up to ten floppy diskettes (not shown). When opened into the illustrated configuration, the diskettes rest upon a pair of guide rails 32 the upper edges of which are sloped relative to the rearward part 24 so that a predetermined portion of the upper face of each diskette is visible.

Turning now additionally to FIGS. 2, 3 and 4 the base part 10 will be described in detail. As illustrated, base part 10 is a single molded part having an apertured bottom 40, sidewalls 44 and 46, a front wall 42 and a rear wall 48 forming the receptacle 12 for receiving upper part 22. The partial closure and support portion 14 is formed integral with receptacle 12 and is joined thereto by the living hinge 16. The elongated portion 50 of portion 14 is provided with stiffening ribs 52.

As can perhaps be better seen in FIG. 4, the locking portion 18 which is separated from portion 50 by the living hinge 20 is comprised of a transverse bar portion 54 having laterally extending locking tabs 56 on each end thereof and a rearwardly extending lip 58 which extends across the width of portion 18. Formed in the sidewalls 44 and 46 and above the opening 60 in bottom 40 are guide slots 62 which are oriented parallel to bottom 40 except for the dog-legged forward portion 64 which extends downwardly. Note that the front wall 42 is provided at each end thereof with thumb slots 66 the purpose of which will be described below.

As shown in FIG. 3, the bottom surfaces of base part 10 are textured.

In FIGS. 5, 6 and 7, upper part 22 is illustrated in detail. It will be noted that portions of the upper surface of part 22 shown in FIG. 5 at 70 and 72 are textured with the portion 72 having recessed areas 74 and 76 which are intended to respectively receive an index sticker and a manufacturer's or distributor's name plate or sticker. The forward edge 78 of part 22 is cantilevered forward to provide a stop which will be further described below. A pair of apertures 80 and 82 are provided in the upper portion of part 22 and are separated by a transversely extending bar 84 which is recessed below the surface of area 70. The sides and foremost edge of aperture 80 are formed by portions 86, 88 and 90 which are also recessed below the surface of portion 70. Positioned along each side of part 22 are three projections or detents 92, 94 and 96 the purpose of which will be further described below.

As perhaps best illustrated in FIG. 7, part 22 includes a pair of lower sidewalls 100 and a pair of upper sidewalls 102. The upper sidewalls are joined by a back wall 104 to which the guide rails 32 are integrally formed. Sidewalls 100 are provided with notches 106 and detent-receiving recesses 108. The textured upper surface 70 is exended outwardly beyond sidewalls 100 to form stops 110 the purpose of which will be further described below. The leftmost extremity 112 of portion 70 is cantilevered outwardly beyond the extremities of sidewalls 100 to provide opening lift surfaces as will be further described below.

Turning now to FIGS. 8 and 9, assembly of the base 10 and upper part 22 will be discussed. The parts are interlocked together by extending the part 58 of portion 18 through the aperture 82 and then rotating portion 18 into the plane of surface 70 allowing the tabs 56 to snap into locking position behind walls 70. The portion 72 is then rotated clockwise as depicted in FIG. 7 or counter clockwise as depicted in FIG. 8 toward portion 70 and about the living hinge 28. The folded part is then inserted into receptacle 12 causing the detents 94 to snap into position in guide slots 62. By moving detents 94 forward and downwardly into the portion 64 of slot 62 as illustrated in FIG. 8 and allowing portion 72 to rotate forwardly until it engages front wall 42 the unit will assume the display configuration and floppy diskettes (not shown) disposed on edge between portions 70 and 72 and resting upon guides 32 will normally lean rearwardly with the forward most disk being displaced downwardly relative to the diskettes behind so as to expose the upper edges thereof. By placing identifying indicia on the exposed upper face portions of the diskettes they may be readily accessed. Note that portion 72 allows the diskettes to be rotated forwardly to view the entire face of any diskette.

In order to close and lock the unit, portion 72 is first rotated in the direction indicated by arrow 1 until detents 92 lockingly engage the recesses 108. The folded upper part 22 is then lifted slightly so that the detents 94 move upwardly in slot portions 64 and the unit is then rotated clockwise in the direction indicated by arrow 2 with the detents 94 sliding along slots 62. At the same time, the base portion 50 is rotated in the direction indicated by arrow 3 until substantially all of the upper part 22 is received within receptacle 12 and the detents 96 snap into engagement with slots 62 locking the unit in its storage configuration as indicated in FIG. 9.

It will be appreciated that when rotated into the storage position shown in FIG. 9, the label bearing portion 72 protrudes through the opening 60 in base 10 thereby making the labels contained in recesses 74 and 76 readily visible.

In order to open the unit into the display position, the user grasps the unit in both hands and with his thumbs positioned in the depressions 66 lifts the edge 112 upwardly until detents 96 snap out of slots 62, rotates the folded upper part upwardly causing detents 94 to move forwardly in slots 62 and then drop into slot portions 64. The edge 78 of portion 72 is then grasped with the forefinger, within notches 106, and pulled forwardly causing detents 92 to become disengaged from recesses 108 allowing portion 72 to rotate forwardly into the position shown in FIG. 8. This opening rotation has the effect of causing the forward most diskettes to slide forwardly down guides 32 to effect the upper part display thereof as described above.

Although the present invention has been described herein in terms of a presently preferred embodiment, it will be appreciated by those skilled in the art that alterations and modifications thereof may readily be made to suit particular needs and applications. It is therefore intended that the following claims be interpreted as covering all such alterations and modifications as fall within the true spirit and scope of the invention.

What is claimed is:

1. A storage and display unit for floppy diskettes and the like, comprising, in combination:
    (a) a base portion including receptacle forming means for providing a receptacle having an open top defining a center, a lower region and an upper periphery, said receptacle forming means provided with a support portion hingedly attached to said upper periphery and arranged for extending toward said center of said receptacle means, said support portion including an elongated portion extending from said receptacle forming means and terminating in a locking means, a living hinge formed in said support portion immediately adjacent said locking means for hingedly separating same from said elongated portion; said locking means including a transverse bar portion having spaced ends provided thereon with a pair of locking tabs, and a lip extending from said bar portion and away from said elongated portion;
    (b) an upper part including a first portion provided with a pair of adjacent apertures, a transversely extending bar disposed separating said pair of apertures, said apertures being arranged to receive said locking means, said bar portion of said locking means being receivable in one of said pair of apertures with said lip being retainable in the other of said pair of apertures, said locking tabs retaining said bar in an associated one of said pair of apertures, said first portion being hingedly attached to said support portion of said receptacle forming means at a point thereon spaced from the upper periphery of said receptacle forming means, a second portion of said upper part being hingedly attached to said first portion at a point spaced from the point of attachment of said first portion to said receptacle forming means and arranged for rotation between a position common to said first portion and a position extending away from said first portion, said upper part being arranged for rotation relative to and in cooperation with said support portion between a position within said receptacle forming means and a position extending away from said receptacle forming means; and
    (c) guide means associated with said receptacle forming means and said upper part and formed integrally therewith for directing movement of said upper part relative to said receptacle forming means between said position within said receptacle forming means and said position extending away from said receptacle forming means.

2. A unit as defined in claim 1, wherein said elongated portion is provided with at least one stiffening rib arranged extending between said receptacle forming means and said living hinge.

3. A unit as defined in claim 1, wherein said receptacle forming means comprises a sidewall standing between said lower region and said upper periphery of said receptacle forming means, and said guide means including said sidewall of said receptacle forming means defining a longitudinal slot, with said first portion of said upper part including detent means arranged for being slideably received in said slot.

4. A unit as defined in claim 3, wherein said slot includes a doglegged portion arranged extending in said sidewall toward said lower region of said receptacle forming means, said detent means including a first projection slideably engaged in said slot, and a second projection engageable in said slot when said upper part is disposed entirely within said receptacle forming means.

5. A unit as defined in claim 4, wherein said detent means further includes a third projection provided on said second portion of said upper part, and said first portion being provided with a recess arranged for selectively receiving said third projection when said second projection is in a common position with said first portion of said upper part.

6. A unit as defined in claim 5, wherein said receptacle forming means includes a further sidewall disposed in spaced relation and substantially parallel to said sidewall, and said slot being one of a pair of slots provided in said sidewall and said further sidewall, respectively; a further recess like said recess and provided in said further wall in opposed relation to said recess; and said first projection, second projection, and third projection, being each one of a pair of such projections, each of said pairs of projections cooperating with respective associated ones of said slots and recesses for guiding movement of said upper part relative to said base portion.

7. A unit as defined in claim 6, wherein said second portion of said upper part is connected to said first portion by a living hinge.

* * * * *